United States Patent
Nina Lillelund et al.

(10) Patent No.: US 9,243,760 B2
(45) Date of Patent: Jan. 26, 2016

(54) OPTICAL LIGHT MIXER PROVIDING A HOMOGENIZED AND UNIFORM LIGHT BEAM

(75) Inventors: Kildeby Nina Lillelund, Gedved (DK); Dennis Thykjaer Jørgensen, Rønde (DK)

(73) Assignee: Martin Professional ApS, Aarhus N. (DK)

( * ) Notice: Subject to any disclaimer, the term of this patent is extended or adjusted under 35 U.S.C. 154(b) by 250 days.

(21) Appl. No.: 13/991,435

(22) PCT Filed: Nov. 25, 2011

(86) PCT No.: PCT/DK2011/050450
§ 371 (c)(1),
(2), (4) Date: Jul. 12, 2013

(87) PCT Pub. No.: WO2012/083957
PCT Pub. Date: Jun. 28, 2012

(65) Prior Publication Data
US 2013/0294066 A1    Nov. 7, 2013

(30) Foreign Application Priority Data
Dec. 23, 2010  (DK) .................................. 2010 70580

(51) Int. Cl.
| | |
|---|---|
| *F21V 7/04* | (2006.01) |
| *G02B 6/00* | (2006.01) |
| *G09F 13/00* | (2006.01) |
| *F21K 99/00* | (2010.01) |
| *F21V 8/00* | (2006.01) |
| *G02B 27/09* | (2006.01) |
| *F21V 7/00* | (2006.01) |
| *G02B 6/42* | (2006.01) |

(52) U.S. Cl.
CPC ... *F21K 9/54* (2013.01); *F21V 7/00* (2013.01); *G02B 6/0008* (2013.01); *G02B 27/0927* (2013.01); *G02B 27/0994* (2013.01); *G02B 6/4298* (2013.01)

(58) Field of Classification Search
CPC ...... F21K 9/54; G02B 6/008; G02B 27/0927; G02B 27/0994
USPC .............. 362/311.02, 311.06, 326, 331–332, 362/551; 359/641
See application file for complete search history.

(56) References Cited

U.S. PATENT DOCUMENTS

| | | | |
|---|---|---|---|
| 7,194,185 B2 * | 3/2007 | Watanabe ..................... 385/146 |
| 7,286,296 B2 * | 10/2007 | Chaves et al. ................. 359/641 |
| 2007/0024971 A1 | 2/2007 | Cassarly | |
| 2007/0230159 A1 * | 10/2007 | Cortenraad et al. ............ 362/85 |
| 2010/0188753 A1 | 7/2010 | Paulussen et al. | |

OTHER PUBLICATIONS

International Search Report; International Application No. PCT/DK2011/050450; International Filing Date: Nov. 25, 2011; 3 pages.

* cited by examiner

*Primary Examiner* — Jason Moon Han
(74) *Attorney, Agent, or Firm* — Blank Rome LLP

(57) ABSTRACT

The present invention relates to an optical light mixer providing a homogenized and uniform light beam where the optical light mixer is formed of a solid transparent material and light enters the optical light mixer through an entrance surface and is reflected through said body to an exit surface where said light exits said optical light mixer. The optical light mixer comprises a first part formed as a pyramid frustum where the top surface of the pyramid frustum forms the entrance surface and a second part formed as a cone frustum and where the bottom surface the cone frustum forms the exit surface. The present invention relates also to an illumination device comprising a number of light sources and such optical light mixer.

16 Claims, 8 Drawing Sheets

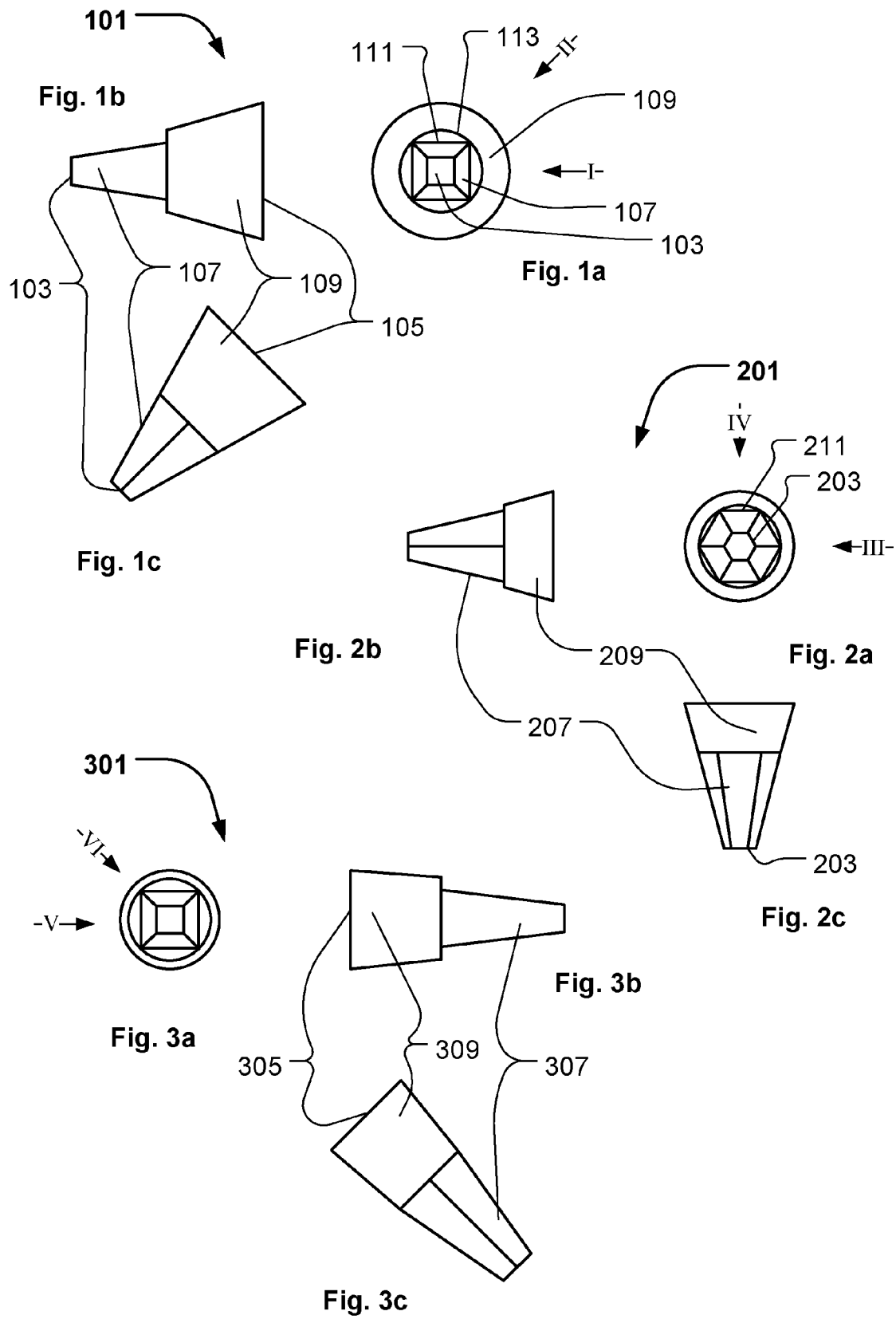

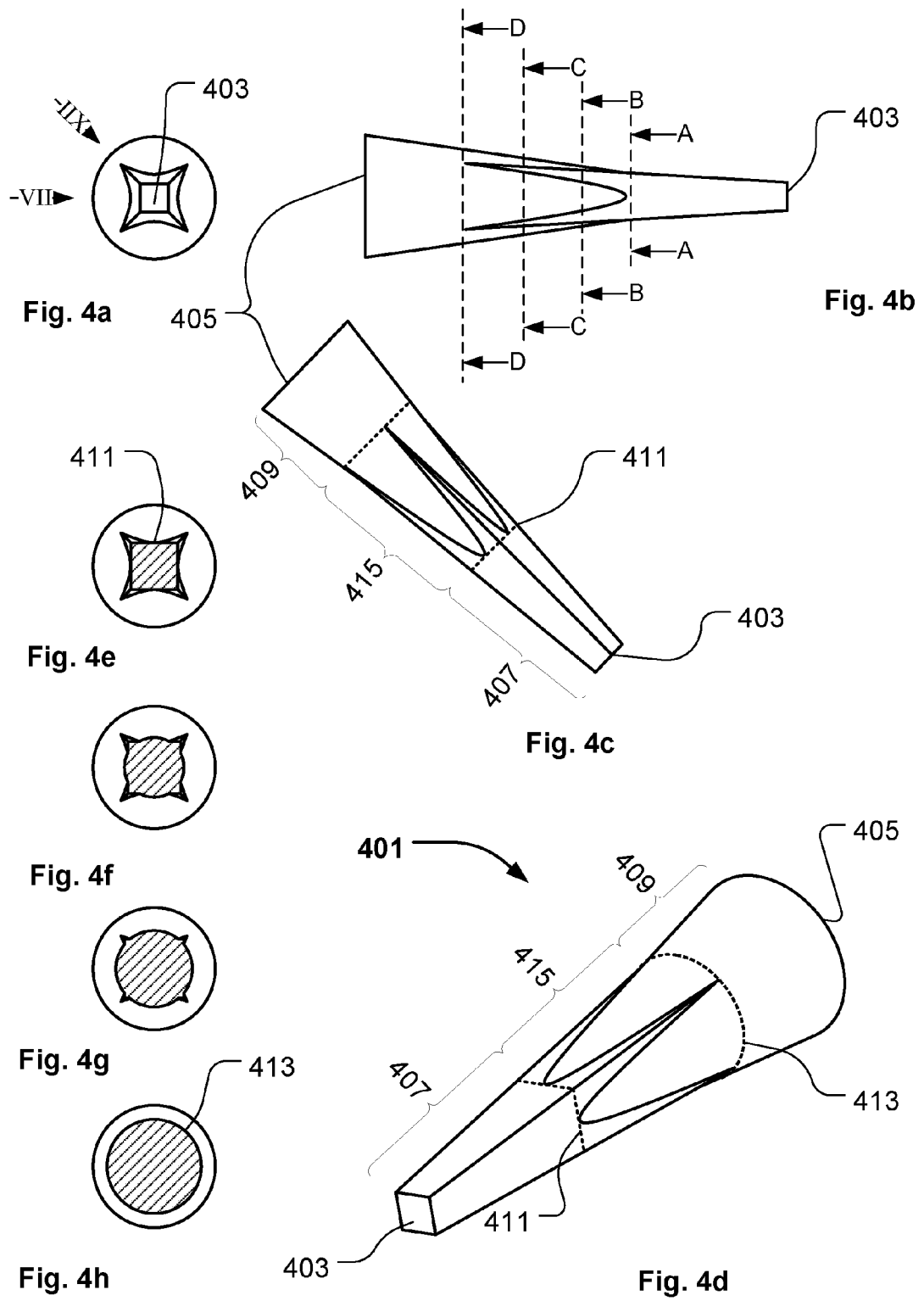

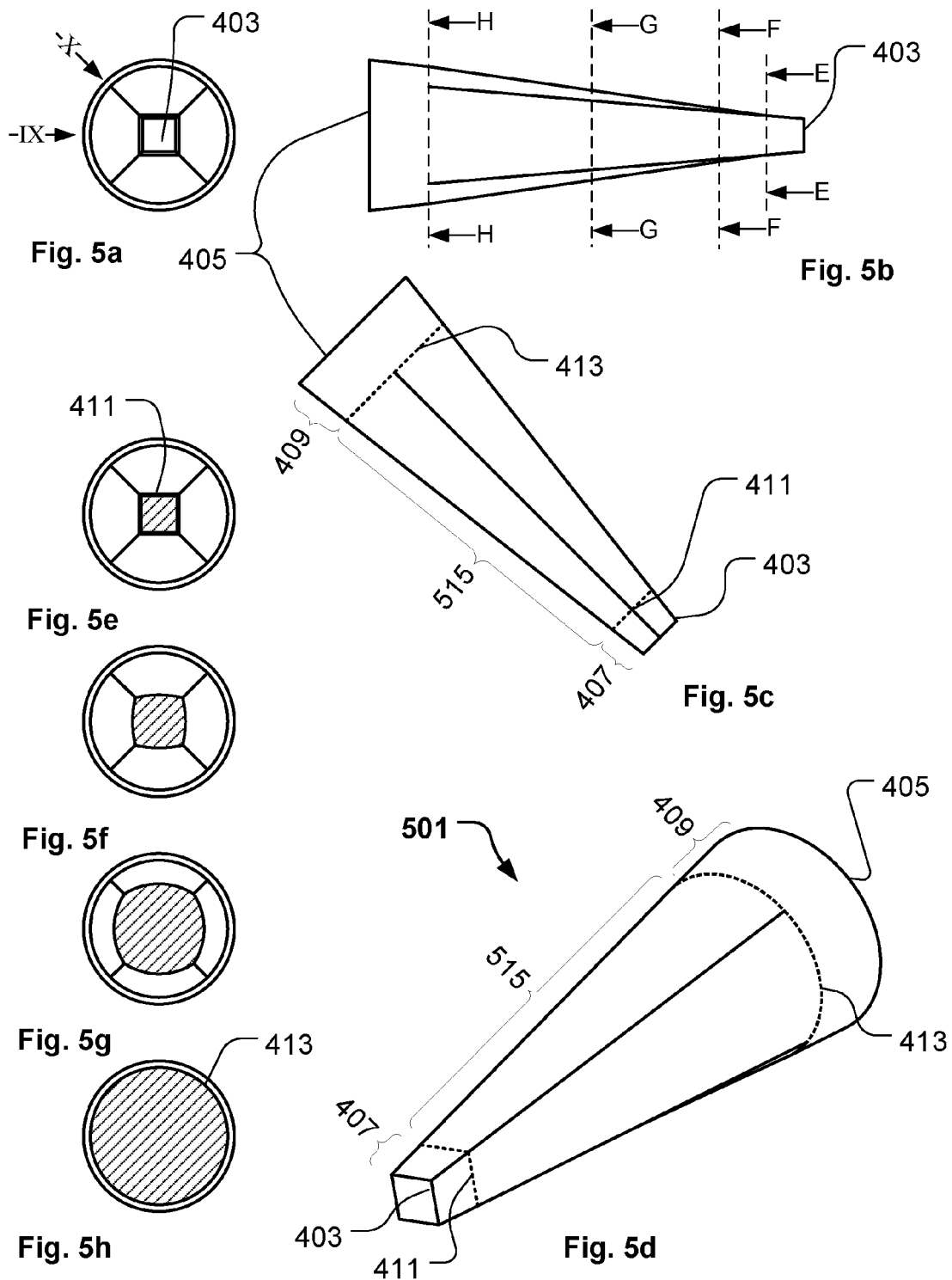

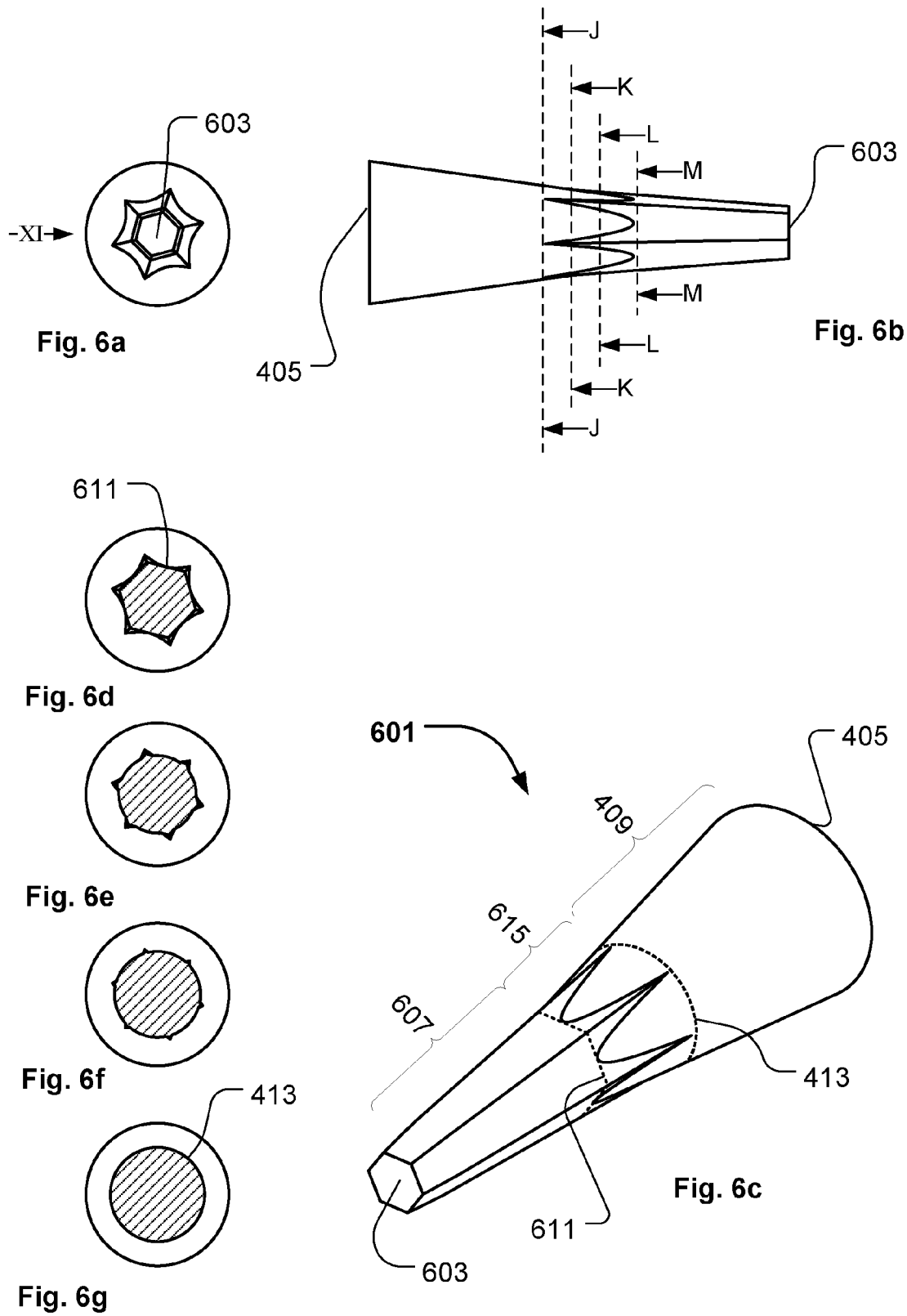

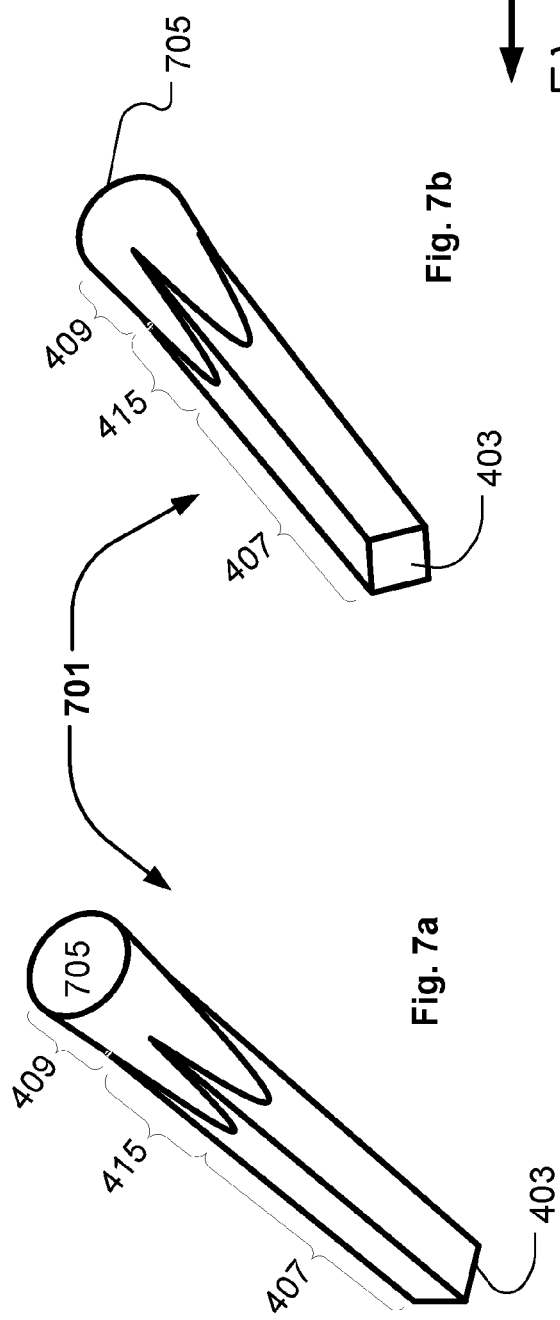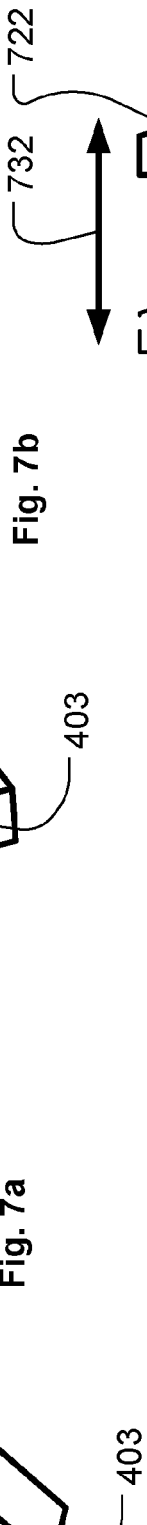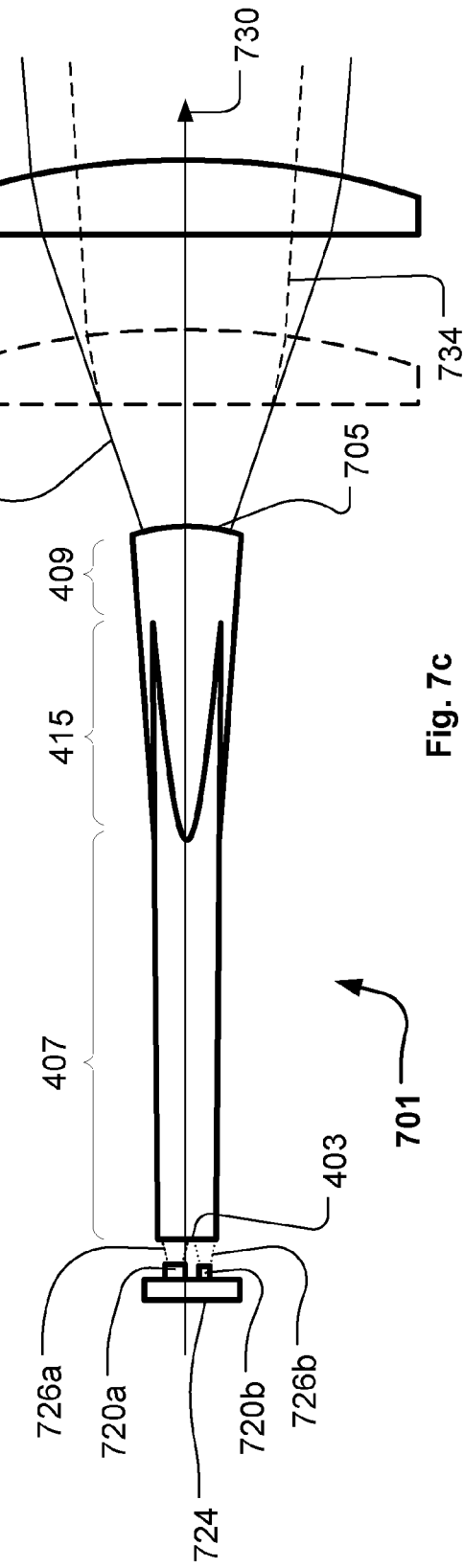

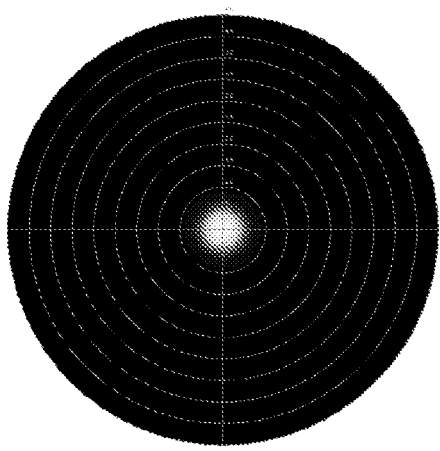
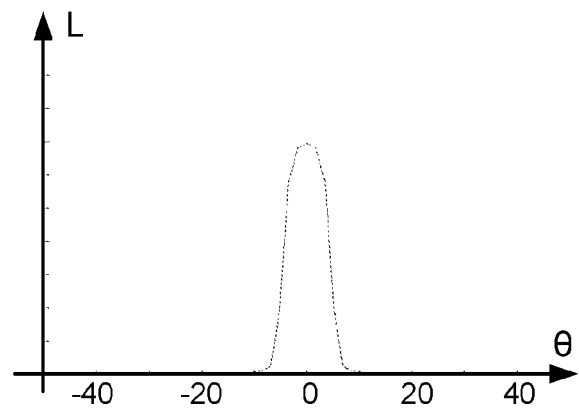
Fig. 11a                    Fig. 12a
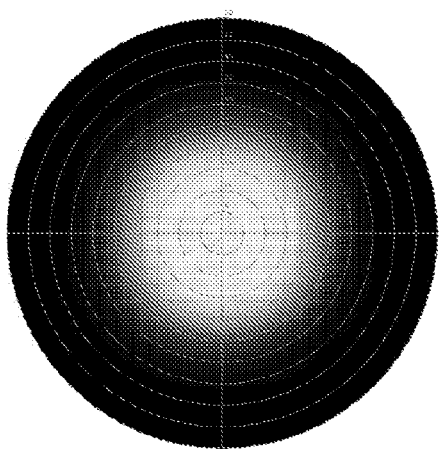
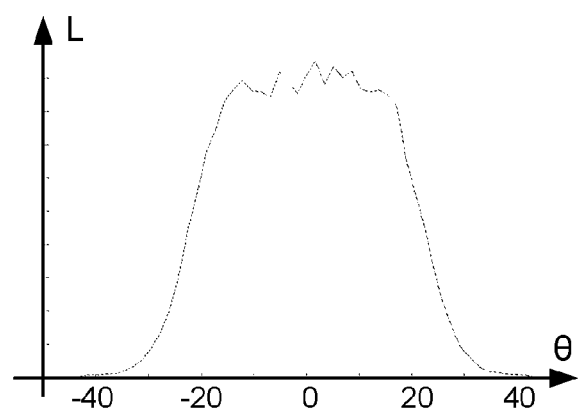
Fig. 11b                    Fig. 12b

OPTICAL LIGHT MIXER PROVIDING A HOMOGENIZED AND UNIFORM LIGHT BEAM

FIELD OF THE INVENTION

The present invention relates to an optical light mixer providing a homogenized and uniform light beam where the optical light mixer is formed of a solid transparent material and light enters the optical light mixer through an entrance surface and is reflected through said body to an exit surface where said light exits said optical light mixer. The present invention relates also to an illumination device comprising a number of light sources and such optical light mixer.

BACKGROUND OF THE INVENTION

Many illumination designs benefit from homogenized light. Accordingly, efforts have been made to obtain substantially uniform illumination distributions from light sources, such as light emitting diodes (LEDs) that produce non-uniform illumination distributions. One known method of achieving this goal employs mixing rods. In many embodiments, flux from a light source is transferred to an input end of a mixing rod. The flux propagates through the mixing rod, typically reflecting from the sidewalls of the mixing rod one or more times. In certain embodiments, coupling a light source that produces a non-uniform illumination distribution with the input end of the mixing rod produces a substantially uniform illumination distribution at an output end of the mixing rod.

Certain mixing rod configurations are particularly effective in achieving substantially uniform illumination distributions. For example, straight rods having rectangular or hexagonal cross-sections are known to work well. Such configurations produce rectangular and hexagonal beam patterns, respectively. However, circular beam patterns are preferred in many applications, such as flashlights, spotlights, fiber illuminators, and projection systems with circular pupils. Unfortunately, circular straight rods generally provide inferior spatial mixing as compared with rectangular or other faceted configurations. Accordingly, hexagonal mixing rods are often used in place of circular mixing rods in order to approximate a circular beam pattern while achieving the advantages of a mixing rod having planar sidewalls.

It is known to combine mixing rods with a zoom lens for changing the divergence of the light beam. However this results often in the fact the an illumination distribution not substantially uniform illumination distributions in the entire zoom range, as the known mixing rods are designed such that they only provide a uniform/homogenized in a certain plane of long the light beam for instance at an optical gate. Consequently, there is a need for mixing rods that produce circular beam patterns that have substantially uniform illumination distributions. Further there is a need for mixing rods which can be combined with a zoom lens and maintain a substantially uniform illumination distribution in the entire zoom range.

U.S. Pat. No. 6,219,480 discloses an optical coupler for coupling light along an axis between a light port on one side of the coupler and a plurality of light ports on another side of the coupler. The coupler comprises a one-side stage with a light port and a many-side stage with a plurality of arms situated about the axis, each having a light port. A midput region separates the one-side and many-side stages and is situated along the axis where the plurality of arms at least initially starts to split from each other in a direction towards the many-side light ports along the axis. Cross sections of each of the respective initial portions of the arms along the direction are arranged about the same distance from the axis. The cross sectional areas of the arms along the axis are larger at a break point region at which the arms fully separate from each other along the axis than at the many-side light ports. At least a pair of the arms each start to split along the direction in a substantially symmetrical manner about the axis.

US2007/0024971 discloses various embodiments of light mixers comprising a light pipe having input and output ends and a central region there between. An optical path extends in a longitudinal direction from the input end through the central region to the output end. The central region of the light pipe comprises one or more rippled reflective sidewalls having a plurality of elongate ridges and valleys and sloping surfaces there between. Light from the input end propagating along the optical path reflects from the sloping surfaces and is redirected at a different azimuthally direction toward the output end thereby mixing the light at the output end. In some embodiments the cross-sectional shape and area of the mixer are constant along the full length of the mixer and the input face and the output face are the same shape and size. In other arrangements, the cross-sectional shape and/or area of the mixer vary along the length thereof and the input face and the output face may vary with respect to each other in shape and/or size. In some instances, the input face defines a rectangle or square and the output face defines a circle or vice versa. US2007/0024971 explicitly teaches that it is the rippled relective sidewalls and not the shape of light mixer that improves the homogenisity of the outgoing light beam. However the rippled reflective sidewalls of the light mixers are difficult to manufacture as they must be designed with very low tolerances which increases the manufacturing costs dramatically. Further the light mixers having the rippled relective sidewalls need to be positioned very accurate in relation to the light sources, which again increases manufacturing costs.

U.S. Pat. No. 6,200,002 discloses a light source which includes an array of LEDs in each of a plurality colors such as red, green, and blue in the entrance aperture of a tubular reflector which preferably has convex walls facing the optic axis and flares outward toward the exit aperture, and preferably has a polygonal cross section such as a square. Mixing of colors is further promoted by utilizing a large number of small LEDs with the LEDs of each color being centered on the optic axis.

U.S. Pat. No. 6,547,416 discloses A light source, which includes an array of LED components in each of a plurality of colors such as red, green, and blue in the entrance aperture of a tubular reflector which has an exit aperture, an optic axis extending between the apertures, and a reflective circumferential wall extending between the apertures to reflect and mix light from the array of LED components. At least a portion of the circumferential wall of the reflector body has a polygonal cross-section taken normal to the optic axis, and at least a portion of the cross-section taken parallel to the optic axis includes segments of a curve joined one to the next to form a plurality of facets for reflecting light from the LED components to said exit aperture. Preferably, the segments of the curve included in the cross-section of the reflector body taken parallel to the optic axis are contiguous, linear trapezoidal facets.

EP2211089 discloses an apparatus for outputting a mixed-colored light beam comprises a light mixer and a lens. The light mixer is adapted to mix light received from at least two light emitters, each of the two light emitters having a differently colored light output, wherein the mixer is adapted to mix the received light so that a mixing degree of mixed light output by the mixer is at least 50 percent, wherein a mixing degree of 100 percent is a fully mixed light. The lens is spaced apart from the light mixer, wherein the lens is attached to a lens holder in such a way that the lens can be moved with respect to the light mixer in order to vary a size of the mixed-colored light beam output by the lens. EP2211090 discloses a spotlight comprising light emitting diode modules wherein each LED module comprises at least two light emitting diodes with different light emission spectra and a light mixer, wherein each light mixer is arranged at one side of the light mixer in cooperation with an assigned LED module and each light mixer is configured to mix the different light emission spectra of the at least two LEDs of the assigned LED module to form a light beam, and wherein exit surfaces at the other side of the light mixers are arranged next to each other in a matrix with its light beams of the light mixers form a common light beam and a focusing optics for focusing the common light beam. EP2211089 and EP2211090 disclose that an iris can be positioned in the common light beam in order to create a circular light beam by chopping the common light beam. However this will decrease the efficiency and efficacy of the light system.

WO10113100A discloses an LED collimation optics module and luminaire using the same, and optics device for stage lighting. In one embodiment of the LED collimation optics module, an LED chip provides a plurality of sources of light (G, R, B, W). An optical conductor is superposed on the LED chip to mix the light received from the plurality of sources of light. After passing through the optical conductor, the mixed light enters a compound parabolic concentrator which is coupled to the optical conductor. The compound parabolic concentrator collimates the light received from the optical conductor such that a homogeneous pupil is emitted. This light mixing optics are relativily long and an illumination device which this type of light mixing optics are thus also to very long which is undesired in connection with moving head light fixtures as it can decrease the speed of movement of the moving head. It is further difficult to integrate the LED collimation optic modules into a zoom effect system in an effective way as such zoom effect system must be very large in order.

DESCRIPTION OF THE INVENTION

The object of the present invention is to solve the above described limitations related to prior art and provide compact light mixing system which is easy to produce and integrate into an illumination system. This is achieved by a light mixer and illumination device as described in the independent claims. The dependent claims describe possible embodiments of the present invention. The advantages and benefits of the present invention are described in the detailed description of the invention.

DESCRIPTION OF THE DRAWING

FIG. 1a-1c illustrate a first embodiment of an optical light mixer according to the present invention;

FIG. 2a-2c illustrate a second embodiment of an optical light mixer according to the present invention;

FIG. 3a-3c illustrate a third embodiment of an optical light mixer according to the present invention;

FIG. 4a-4h illustrate a fourth embodiment of an optical light mixer according to the present invention;

FIG. 5a-5h illustrate a fifth embodiment of an optical light mixer according to the present invention;

FIG. 6a-6g illustrate a sixth embodiment of an optical light mixer according to the present invention;

FIG. 7a-7b illustrate a seventh embodiment of an optical light mixer according to the present invention;

FIG. 7c illustrates the seventh embodiment of the optical light mixer in used in an optical zoom system;

FIG. 11a-11b illustrate cross sectional polar light distributions a distance after the zoom system;

FIG. 12a-12b illustrate angular light distributions a distance after the zoom system in illustrated in FIGS. 8a and 8b.

DETAILED DESCRIPTION OF THE INVENTION

Figure 8A:
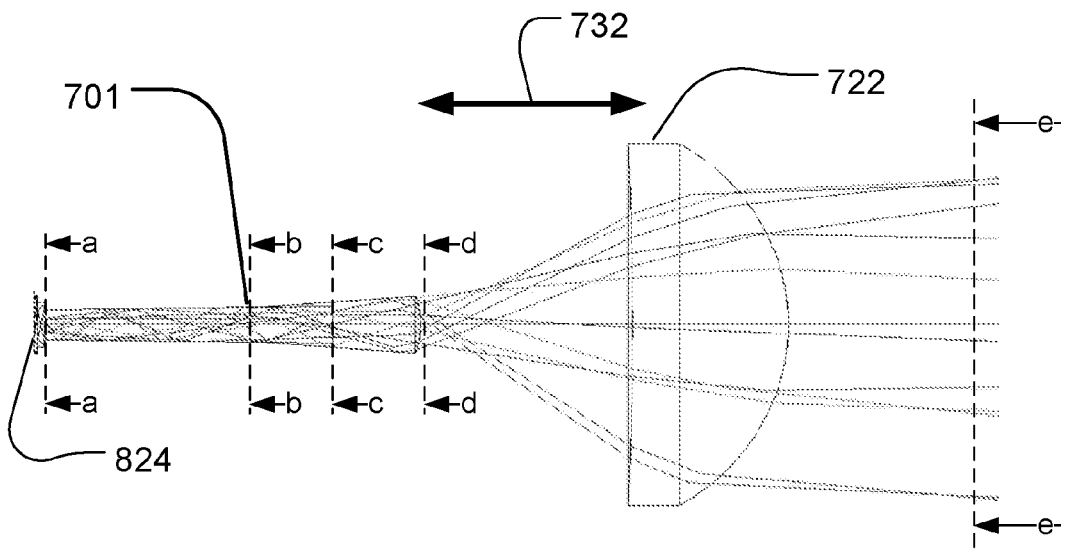
FIG. 8a-8b illustrate light beams through the optical zoom system of FIG. 7c.

FIG. 1a-1c illustrate a first embodiment of an optical light mixer 101 according to the present invention, where FIG. 1a is a bottom view, FIG. 1b a side view seen from arrow I and FIG. 1c is a side view seen from arrow II.

The light mixer 101 is formed of a solid transparent material such as glass or polymer. Light enters the light mixer through an entrance surface 103 at the bottom side and is reflected through the light mixer to an exit surface 105 at the top side, where the light exits the light mixer. The optical light mixer comprises a first part formed as a pyramid frustum 107 and a second part formed as a cone frustum 109. The top surface of the pyramid frustum forms the entrance surface 103, and light enters therefore the light mixer through the top surface of the pyramid frustum and is transmitted through the pyramid frustum to the bottom surface of the pyramid frustum 111 where it enters the cone frustum through its top surface 113. The person skilled in the art of optics realizes that some light beams will travel directly from the top surface to the bottom surface of the pyramid frustum and that other light beams will be reflected at the plane side walls of the pyramid frustum for instance by total internal reflection or by reflective coating applied to the outer surface of the pyramid frustum.

Hereafter, the light is transmitted through the cone frustum to its bottom surface 105 where it exits the light mixer and the bottom surface 105 of the cone frustum forms thus the exit surface. The skilled person realizes that some light beams will travel directly from the top surface to the bottom surface of the cone frustum and that other light beams will be reflected at the curved side walls of the cone frustum for instance by total internal reflection or by reflective coating applied to the outer surface of the cone frustum. The skilled person realizes that the area of the top surface of the pyramid frustum is smaller than the area of its' bottom surface. Similar the area of the top surface of the cone frustum is smaller than the area of its' bottom surface.

The light mixer illustrated in FIG. 1a-1c makes is possible to provide a circular, uniform and homogenized light beam, as light entering the light mixer is mixed such that it is substantially equally distributed across the light beam and such that the light beam has a substantially uniform divergence in relation the center axis of the light mixer. The cross section of the outgoing light beam is further circular. It is hereby possible to mix light from a multiple number of light sources into one uniform homogenized light beam which can be use in a zoom system where the divergence of the light beam can be change without destroying the homogenized light distribution across the light beam. The zoom system can further be constructed using optic elements as known in the art. That the light is substantially equally distributed across the light beam means that the smallest light intensity inside the light beam is at least 50% of the largest intensity inside the light beam. That the light beam has a substantially uniform divergence means that the light is substantially equally distributed across the polar angles inside the beam divergence. The skilled person realize that width of the light beam does not have completely sharp edges and that the width can be obtained in many different ways for instance as defined by commonly used methods such as, D4σ, 10/90 or 20/80 knife-edge, 1/e2, FWHM and D86. Further the skilled person realize that the homogenized light beam can have a substantial flat light distributional or a "hotspot" at the center of the light beam.

This is achieved as the pyramid frustum firstly mixes the light beams across the cross section due to the multiple reflections at the plane side walls. The cone frustum changes the total light beam into a circular light beam due to its curved surfaces. The divergence angle of the light beams are uniformed along the light mixer due fact that the sidewalls of both the pyramid frustum and the cone frustum is angled in relation to the central axis and the angle of the light beams in relation to the optical axis will decreases every time the light beam is reflected at the side surface.

The faceted side walls of the pyramid frustum provides a faster mixing of the light beams as the as light beams experience many reflections due the fact that there near the corner between two neighboring sides/facets are a relatively short distance between two neighboring sides/facets. In contrast hereto this is not the case with conical or cylindrical light mixers where the light is reflected normal to the tangent and needs to travel a larger distance before being reflected again. Further the sides/facets of the pyramid frustum reflect light beams into a larger variety of angels which provides a better light mixing. The cone curved side wall of the cone frustum provides a circular light beam as the light beams additional it reflected.

The provided light mixer is further relative simple compared to prior art light mixers and is further simple and cheap to manufacture as it can be molded or grinded in polymer or glass without small tolerance requirements. Further the provided light mixer provides a circular light beam which can be used n a zoom system which makes it possible to adjust the divergence of the light beam and at the same time main maintain a homogenized and uniform light beam in the entire zoom range. The skilled person realizes that the light mixer can be constructed both as one body and as multiple body parts where for instance the pyramid frustum and cone frustum is produced separately and combined in a later process.

In the illustrated embodiment, the area of the bottom surface of the pyramid frustum is smaller than the area of the top surface of the cone frustum. This ensures that all of the light beams exiting/passing the bottom surface of the pyramid frustum will enter the cone frustum. In other words the top surface of the cone frustum does thus circumscribe the bottom surface of the pyramid frustum.

FIG. 2a-2c illustrate a second embodiment of an optical light mixer 201 according to the present invention where FIG. 2a is a bottom view, FIG. 2b a side view seen from arrow III and FIG. 2c is a side view seen from arrow IV. In this embodiment the top 203 and bottom surface 211 of the pyramid frustum 207 is formed a hexagons. The light exiting the pyramid frustum 207 and entering the cone frustum 209 will as a consequence have a substantially hexagonal cross section and the cone frustum 209 can as a consequence be shorter compared to the cone frustum 109 of FIG. 1a-1c, as less reflections is need in order to transform the hexagonal light beam into a circular light beam. This embodiment can for instance be useful in situations where the cross sectional light distribution of the light entering the light mixer is more homogenized compared to the light entering the light mixer of FIG. 1a-1c. The skilled person realizes that the bottom and top surface of the pyramid frustum can be formed as any polygonal.

FIG. 3a-3c illustrate a third embodiment of an optical light mixer 301 according to the present invention where FIG. 3a is a bottom view, FIG. 3b a side view seen from arrow V and FIG. 3c is a side view seen from arrow VI. In this embodiment the pyramid frustum 307 is similar to the pyramid frustum 107 of the first embodiment of FIG. 1a-1b, however the cone frustum 309 have been modified in that the bottom surface 305 of cone frustum 309 is smaller than the bottom surface 105 of the cone frustum 109. The cross section of the outgoing light beam exiting the light mixer 301 it hereby reduced compared to the outgoing light beam exiting the light mixer 301. The skilled person realizes that the angles of the curved side walls of the cone frustum also is reduced and that it as a consequence can be necessary to provide a longer cone frustum in order to provide a outgoing light beams having substantially the same divergence in relation the center axis of the light mixer. The slops of the sides of the pyramid frustum and cone frustum can thus have any angle.

FIG. 4a-4h illustrate a fourth embodiment of an optical light mixer 401 according to the present invention where FIG. 4a is a bottom view, FIG. 4b a side view seen from arrow VII; FIG. 1c is a side view seen from arrow IIX and FIG. 4d is a perspective view. Cross sectional views of along the lines A-A, B-B, C-C and D-D are respectively shown in FIGS. 4e, 4f, 4g and 4h.

The light mixer 401 is formed of a solid transparent material such as glass or polymer. Light enters the light mixer through an entrance surface 403 at the bottom side and is transmitted through the light mixer to an exit surface 405 at the top side, where the light exits the light mixer. The optical light mixer comprises a first part formed as a pyramid frustum 407, second part formed as a cone frustum 409 and a third part 415 positioned between the pyramid frustum 407 and the cone frustum 409.

The top surface 403 of the pyramid frustum 407 forms the entrance surface 403, and light enters therefore the light mixer through the top surface of the pyramid frustum and is transmitted through the pyramid frustum to the bottom surface of the pyramid frustum 411 where it enters the third part through an input surface 411. In the illustrated embodiment the bottom surface of the pyramid frustum 407 and the input surface of the third part 415 are identical and thus marked 411 and shown in the cross sectional view along line A-A of FIG. 4e. In FIGS. 4c and 4d the transition 411 from the bottom surface of the pyramid frustum to the input surface of the third part is indicated by dotted lines as it would not be visible in these views.

Light entering the third part 415 is hereafter transmitted through the third part to an output surface 413 where it enters the top surface 413 of the cone frustum 409. In the illustrated embodiment the output surface of the third part 415 and the top surface of the cone frustum are identical and thus marked 413 and shown in the cross sectional view along line D-D of FIG. 4h. In FIGS. 4c and 4d the transition 413 from the output surface of the third part to the top surface of the cone frustum is indicated by dotted lines as it would not be visible in these views.

Hereafter, the light is transmitted through the cone frustum to its bottom surface 405 where it exits the light mixer and the bottom surface 405 of the cone frustum forms thus the exit surface.

The skilled person realizes that some light beams will travel directly from entrance surface 403 to the exit surface 405 of the light mixer 401 and that other light beams will be reflected at the side walls of the pyramid frustum, third part and/or the cone frustum for instance by total internal reflection or by reflective coating applied to the outer surface of the cone frustum.

The cross sectional form of the third part 415 transforms gradually form the shape of the input surface 411 to the shape of the output surface 413. In the illustrated embodiment the cross sectional form of the third part changes along its the central axes form a square 411 as shown in FIG. 4e to a circle 413 as shown in FIG. 4h. FIGS. 4f and 4g show the cross sections at two intermediate positions. The cross sections at the intermediated positions are shaped as the outer contour of a circle overlapping a square where the midpoints of the circle and square are aligned and where the diameter of the circle is larger than the sides of the square but smaller that the diagonal of the square. The length of the sides of the square and the diameter of the circle increases along the central axis of the third part. However the diameter of the circle increases faster than the sides of the square. The consequence is that the circular portion of the cross section increases along the centre axis. At the input surface of the third part the diameter of the circle is equal to the sides of the square whereas at the output surface of the third part the diameter of the circle is equal to the diagonal of the square. In other words the third part is formed as combination of a cone frustum and a pyramid frustum where the bottom surface of the pyramid frustum is circumscribed by the bottom surface of the cone frustum and where the top surface of the pyramid frustum circumscribe the top surface of the cone frustum.

Like the light mixers of FIG. 1-3 the light mixer illustrated in FIG. 4a-4h makes is possible to provide a circular, uniform and homogenized light beam, as light entering the light mixer is mixed such that it is substantially equally distributed across the light beam and such that the light beam has a substantially uniform divergence in relation the center axis of the light mixer. The cross section of the outgoing light beam is further circular. It is hereby possible to mix light from a multiple number of light sources into one uniform homogenized light beam which can be use a zoom system where the divergence of the light beam can be change without destroying the homogenized light distribution across the light beam. The zoom system can further be constructed using spherical symmetric optic elements as known in the art.

This is achieved as the pyramid frustum firstly mixes the light beams across the cross section due the multiple reflections at the plane side walls. The cone frustum changes the total light beam into a circular light beam due to its curved surfaces. The divergence angle of the light beams are uniformed along the light mixer due fact that the sidewalls of both the pyramid frustum and the cone frustum is angled in relation to the central axis and the angle of the light beams in relation to the optical axis will decreases every time the light beam is reflected at the side surface. The third part 415 transforms gradually from the pyramid shape to cone shape which ensures a smoother transition from the pyramid frustum to the cone frustum compared to the optical light mixers of FIG. 1-3. Further the third part has the advantages of the corners between two neighboring sides/facets which provides many reflections and at the same time the advantages of the circular cross sections which gradually provide a more circular light beam as the light beams additional it reflected. The third part makes it possible to reduce the length of the light mixer as the third provide both efficient mixing of light due corners between the plane side walls and starts also to form a circular beam due to the curved side wall parts. Further the incremental increase in cross section area between the pyramid frustum and the cone frustum of the light mixers shown in FIGS. 1b, 2b and 3b can be avoided by the third part 415. This incremental increase in cross section areas results in the fact that the part of the cone reflector near its top surface is not by any light beams and this part takes thus up unnecessary space. This can be avoided by providing a third part which gradually changes from the pyramid frustum to the cone frustum.

The provided light mixer is further relative simple compared to prior art light mixers according to the prior art light mixers and is further simple and cheap to manufacture as it can be molded or grinded in polymer or glass without small tolerance requirements. The skilled person realizes that the light mixer can be constructed both as one body and as multiple body parts where for instance the pyramid frustum and cone frustum is produced separately and combined in a later process.

FIG. 5a-5h illustrate a fifth embodiment of an optical light mixer 501 according to the present invention where FIG. 5a is a bottom view, FIG. 5b a side view seen from arrow IX; FIG. 5c is a side view seen from arrow X and FIG. 5d is a perspective view. Cross sectional views of along the lines E-E, F-F, G-G and H-H are respectively shown in FIGS. 5e, 5f, 5g and 5h.

The light mixer 501 is similar to the light mixture of FIG. 4a-4h and similar components are labeled with the same reference number as in FIG. 4a-4h and will not be described here. The major difference between the light mixer illustrated in FIG. 5a-5h and the light mixer illustrated in FIG. 4a-4h is the way the cross section of the third part 515 gradually changes along its center axis form a square 411 (as shown in FIG. 5e) to a circle 413 (as shown in FIG. 5h)). FIGS. 5f and 5g show the cross sections at two intermediate positions and it can be seen that the curvature of the sides of the square gradually increases along the central axes until the curvature of the four sides is large enough to form a circle.

FIG. 6a-6h illustrate a sixth embodiment of an optical light mixer 601 according to the present invention where FIG. 6a is a bottom view, FIG. 6b a side view seen from arrow XI and FIG. 6c is a perspective view. Cross sectional views of along the lines M-M, L-L, K-K and J-J are respectively shown in FIGS. 6d, 6e, 6f and 6g. The light mixer 601 is similar to the light mixture of FIG. 4a-4h and similar components are labeled with the same reference number as in FIG. 4a-4h and will not be described here.

In this embodiment the first part is formed as a pyramid frustum 607 having a hexagonal top surface 603 and a hexagonal bottom surface. The cross sectional form of the third part 615 transforms gradually form the shape of the input surface 611 to the shape of the output surface 413. In the illustrated embodiment the cross sectional form of the third part changes along its the central axes from a hexagon 611 as shown in FIG. 6d to a circle 413 as shown in FIG. 6g. FIGS. 6e and 6f show the cross sections at two intermediate positions. The cross sections in the intermediated positions are shaped as the outer contour of a circle overlapping a hexagon where the midpoints of the circle and hexagon are aligned. The length of the side of the hexagon and the diameter of the circle increases along the central axis of the third part. However the diameter of the circle increases faster than the sides of the hexagon. The third part is formed as combination of a cone frustum and a pyramid frustum where the bottom surface of the pyramid frustum is circumscribed by the bottom surface of the cone frustum and where the top surface of the pyramid frustum circumscribe the top surface of the cone frustum. The person skilled in the art realize that the bottom surface and top surface can be formed as any polygon and the third part gradually transforms for a pyramid frustum having a polygonal cross section to a cone frustum.

FIG. 7a-7c illustrate a seventh embodiment of an optical light mixer 701 according to the present invention where FIG. 7a is front perspective view and FIG. 7b is a bottom perspective view and FIG. 7c is as side view of the optical light mixer embodied in an illumination device.

The light mixer 701 is similar to the light mixture of FIG. 4a-4h and similar components are labeled with the same reference number as in FIG. 4a-4h and will not be described here. In this embodiment the bottom surface 705 the cone frustum comprises further optical means for forming the light exiting the light mixer. The illustrated optical means for forming the light of the cone frustum is formed a curved surface. This makes it possible to diffract the light beams exiting the light mixer for instance in order to create a predefine divergence of the outgoing light beam. The skilled person realize that the optical means for forming the light at the bottom surface of the cone frustum can be formed as additional optical element like convex, concave, spherical and a spherical lenses diffusers covering a part of the bottom surface.

FIG. 7c illustrates the optical light mixer 701 embodied together with a number of light sources 720 and a zoom lens 722. The light sources can for instance be two different LED dies 720a and 720b mounted on a PCB 724 and emitting light having different color (illustrated by a dashed lines 726a and a dotted line 726b). However the skilled person realizes that any kind of light sources can be used. The light from the light sources enters the light mixers at the entrance surface 403 and is mixed through the light mixer 701 as described above into a uniform and homogenized light beam which exits the light mixer at its exit surface (illustrated by solid line 728) and the zoom lens 722 diffract the outgoing light beam. It is also possible to provide optical means between the light sources and the entrance surface of the light mixer. These optical means can be adapted to collect the light emitted by the light sources and direct it towards the entrance surface of the light mixer. For instance in order to ensure the most of the light beams is within the acceptance angle of the light mixer. The optical means can also be adapted to image the light sources at the entrance surface whereby it is archived light sources visible are positioned directly at the entrance surface which may not be possible due to physical restraints. The zoom lens can be move along the optical axis as illustrated by arrow 732 whereby the divergence and beam width of the outgoing light beam can be changed as known in the art of optics. A "ghost" zoom lens 722a is illustrated in dotted lines and illustrates (in dotted lines 734) how the divergence of the outgoing light beams is changed. The zoom lens can be any kind of optical for instance convex, concave, spherical lenses. In one embodiment the zoom lens is a spherical and/or rotationally asymmetric in relation to the optical axis and adapted to compensate for eventual a non homogeneous and non uniform light beams exiting the light mixer. The consequence is that the light mixer can be designed to provide a less homogeneous and non uniform light beam (compared to the optimal design) as the zoom lens is adapted to cooperate with the light mixer to provide the homogeneous and uniform light at the exit surface of the zoom lens. The length of the light mixer can in these situations be shortened further.

Figure 8B:
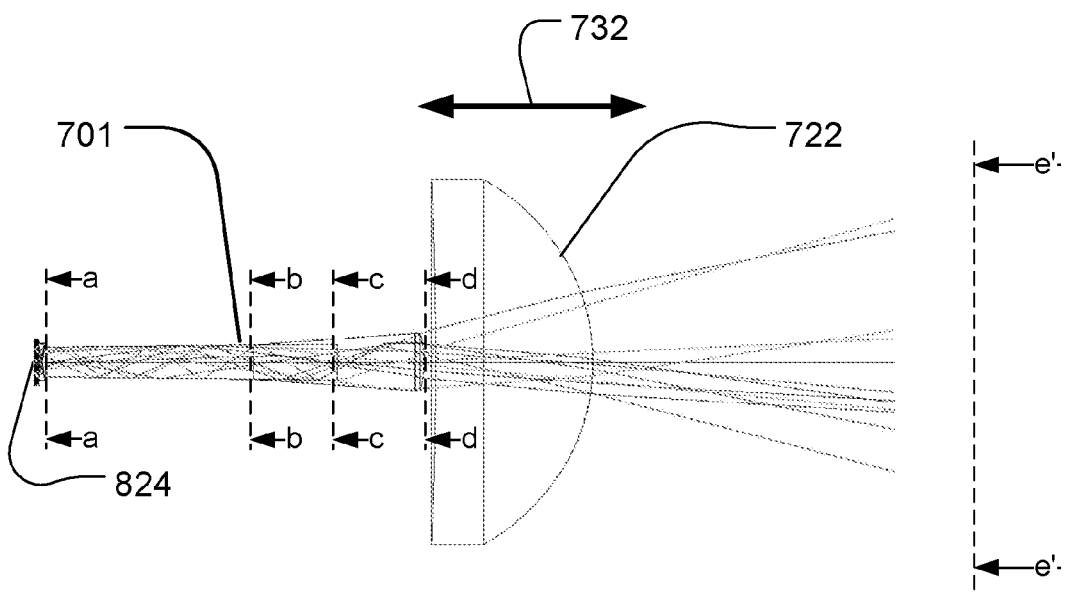

FIGS. 8a and 8b illustrates optical ray simulations of the illumination device of FIG. 7c. In this embodiment light sources are embodied as a 4 in 1 LED comprising a red LED die emitting red light, two green LEDs die emitting green light, and a blue LED die emitting blue light. However skilled person realize that any combination and number of light sources can be used for instance a 4 in 1 RGBW LED comprising a red LED die emitting red light, a green LED die emitting green light, a blue LED die emitting blue light and a white LED die emitting white light. The LED dies can be controlled individually as known in the art of additive dynamic lighting. The skilled person notices that only a few light beams are shown and that the illustrated light beams are three dimensional light beams which have been projected to the plane of the paper. FIG. 8a illustrates the optical ray simulations in a narrow zoom position where the zoom lens 722 have been moved away from the light mixer, and FIG. 8b illustrates the optical ray simulations in a wide zoom position where the zoom lens 722 have been moved away from the light mixer.

FIG. 9a-9d illustrate simulated cross section illumination distributions respectively at the top surface of the pyramid frustum (indicated by line a-a in FIGS. 8a and 8b), at the bottom surface of the pyramid frustum (indicated by line b-b in FIGS. 8a and 8b), at the top surface of the cone frustum (indicated by line c-c in FIGS. 8a and 8b) and at the bottom surface of the cone frustum (indicated by line d-d in FIGS. 8a and 8b). The simulated cross section illumination distributions are gray scale plots where white indicate the brightest illumination and where black indicate the darkest illumination.

FIG. 10a-10d illustrate the angular distribution of the light in relation to the center axis of light mixer respectably at the top surface of the pyramid frustum (indicated by line a-a in FIGS. 8a and 8b), at the bottom surface of the pyramid frustum (indicated by line b-b in FIGS. 8a and 8b), at the top surface of the cone frustum (indicated by line c-c in FIGS. 8a and 8b) and at the bottom surface of the cone frustum (indicated by line d-d in FIGS. 8a and 8b).

Figure 9A:
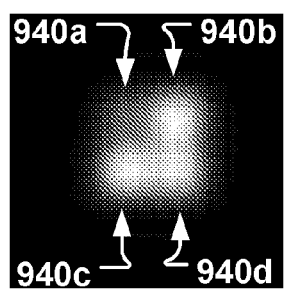
FIG. 9a-9d illustrates cross sectional light distributions at different positions of the optical light mixer in illustrated in FIGS. 8a and 8b.
Figure 10A:
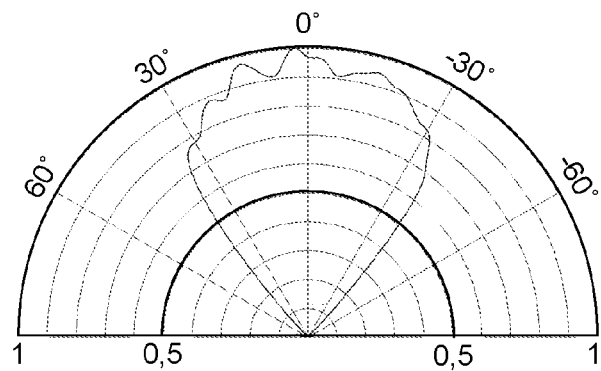
FIG. 10a-10d illustrate angular light distributions at different positions of the optical light mixer in illustrated in FIGS. 8a and 8b.

In FIG. 9a it can be seen that the light is distributed non homogeneously and it is in fact possible to distinguish the four LED dies as the light from the four LED dies can be seen as four separate squares, where top left square 940a indicates light from the blue die, the top right square 940b and bottom left square 940c indicate light from the two green dies and the bottom right square 940d indicates light from the red die. FIG. 10a indicates that the angular distribution at this cross section is approximately 40 degrees (measured as the light beams haft angle in relation to the optical axis) and also substantial equally distributed across the divergence angel.

Figure 9B:
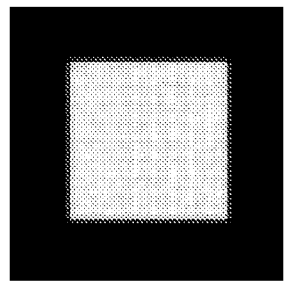
Figure 10B:
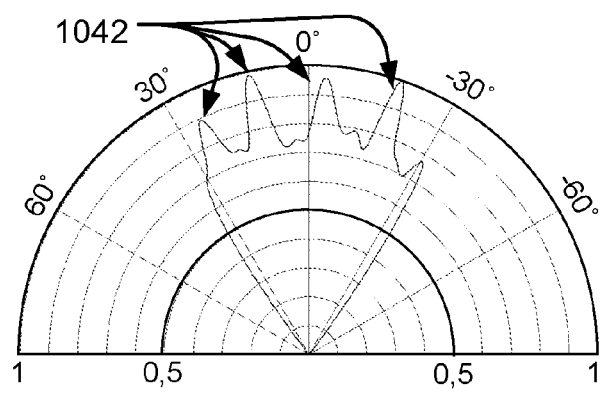

FIG. 9b illustrates that light from the four LED are mixed through the pyramid frustum and substantial equally distributed across the bottom surface of the pyramid frustum which is in fact a desired effect. However at this position the light beam is not circular as is wanted in many situations. Further FIG. 10b illustrates that the divergence angle at this cross section is approximately 30 degrees and that the angular distribution is more inhomogeneous as a number of "fingers" 1042 have been generated through the pyramid frustum. These fingers are due to multiple mirror images of the LED dies created by the multiple reflections at the plane sides of the pyramid frustum. The consequence is that if, if the light exiting the bottom surface of the pyramid frustum is integrated into a zoom system, is difficult to maintain a substantial equally light distribution across through the entire zoom range.

Figure 9C:
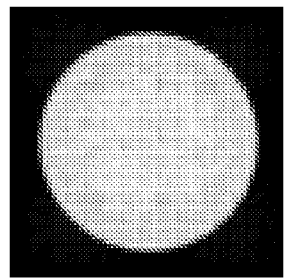
Figure 10C:
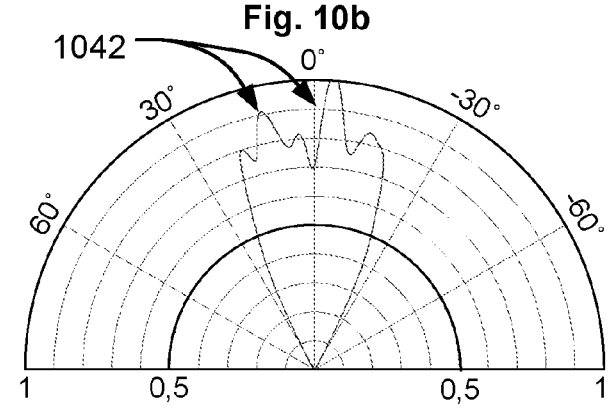

FIG. 9c illustrates that cross section of the light beam through the third part is transformed into a circular light beam having a substantial equal light distribution Further FIG. 10c illustrates that the divergence angle at this cross section is reduced to approximately 25 degrees. However some of the "fingers" 1042 are still relatively large and it is thus is difficult to maintain a substantial equally light distribution across through the entire zoom range still, if the output surface of the third part is integrated into a zoom system.

Figure 9D:
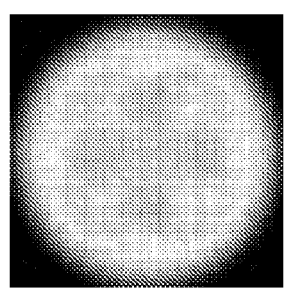
Figure 10D:
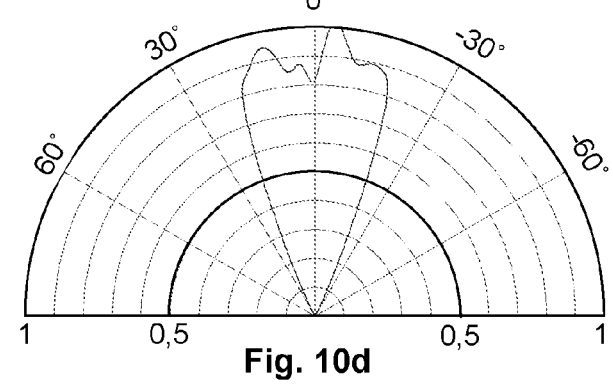

FIG. 9d illustrates that cross section of the light beam through at the bottom surface of the cone frustum is a circular light beam having a substantial equal light distribution and that the beam width of the light beam have been increased through the cone frustum. Further FIG. 10d illustrates that the divergence angle at this cross section is reduced to approximately 20 degrees and that the size of the fingers have been significantly reduced. As a consequence is a substantial equally light distribution across can be maintained through the entire zoom range still, if the light exiting the bottom surface of the cone frustum part is integrated into a zoom system.

FIGS. 11a and 11b illustrate simulated polar illumination distributions at a distance (indicated by line e-e in FIGS. 8a and 8b) after the zoom lens 722, where the zoom FIG. 11a corresponds to the situation (narrow beam) in FIG. 8a and FIG. 11b corresponds to the situation in FIG. 8b (wide beam). FIGS. 12a and 12b illustrate the corresponding the polar light distribution through a center cross sectional axes of the light beam. It can be seen that the resulting beam is very homogeneous and uniform over the entire zoom range and the zoom range are approximately 15-55 degrees (full angle in respect to the optical axis).

The invention claimed is:

1. An optical light mixer providing a homogenized and uniform light beam, said optical light mixer being formed of a solid transparent material, where light enters said optical light mixer through an entrance surface and is reflected through a body to an exit surface where said light exits said optical light mixer, wherein said optical light mixer comprises:
    a first solid transparent part formed as a pyramid frustum where the top surface of said pyramid frustum forms said entrance surface;
    a second solid transparent part formed as a cone frustum, the bottom surface of said cone frustum forms said exit surface.

2. The optical light mixer according to claim 1, wherein the area of the bottom surface of said pyramid frustum is smaller than the area of the top surface of said cone frustum.

3. The optical light mixer according to claims 1, wherein said optical light mixer further comprises:
    a third part comprising an input surface and an output source, said third part is positioned between said first part and said second part such that light exiting the bottom surface of said pyramid frustum enters said input surface and is reflected through said third part to said output surface where after said light enters the top surface of said cone frustum.

4. The optical light mixer according to claim 3, wherein the cross section of said input surface is substantially identical to said bottom surface of said pyramid frustum.

5. The optical light mixer according to claims 3, wherein the cross section of said output surface is substantially identical to said top surface of said cone frustum.

6. The optical light mixer according to claim 4, wherein the cross sectional form of said third part gradually transforms from said cross sectional form of said input surface to said cross sectional form of said output surface.

7. The optical light mixer according to claims 1, wherein said bottom surface of said cone frustum comprises further optical means for forming said light exiting said light mixer.

8. An illumination device comprising a number of light sources generating light and an optical light mixer, said optical light mixer being formed of a solid transparent material, and said light enters said optical light mixer through an entrance surface and is reflected through a body to an exit surface where said light exits said optical light mixer, wherein said optical light mixer comprises:
    a first solid transparent part formed as a pyramid frustum where the top surface of said pyramid frustum forms said entrance surface;
    a second solid transparent part formed as a cone frustum, the bottom surface of said cone frustum forms said exit surface.

9. The illumination device according to claim 8, wherein the area of the bottom surface of said pyramid frustum is smaller than the area of the top surface of said cone frustum.

10. The illumination device according to claims 8, wherein said optical light mixer further comprises:
    a third part comprising an input surface and an output source, said third part is positioned between said first part and said second part such that light exiting the bottom surface of said pyramid frustum enters said input surface is reflected through said third part to said output surface where after said light enters the top surface of said cone frustum.

11. The illumination device according to claim 10, wherein the cross section of said input surface is substantially identical to said bottom surface of said pyramid frustum.

12. The illumination device according to claims 10, wherein the cross section of said output surface is substantially identical to said top surface of said cone frustum.

13. The illumination device according to claim 11, wherein the cross section form of said third part gradually transforms from said cross sectional form of said input surface to said cross sectional form of said output surface.

14. The illumination device according to claims 8, wherein said bottom surface of said cone frustum comprises further optical means for forming said light exiting said light mixer.

15. The illumination device according to claims 8, wherein said illumination device comprises an optical zoom element, said optical zoom element is adapted to deflect said light exiting said optical light mixer and is movable in relation to said optical light mixer.

16. The illumination device according to claim 15, wherein the zoom lens is spherical and rotationally asymmetric in relation to the optical axis.

* * * * *